United States Patent
Chou

(10) Patent No.: US 6,917,506 B2
(45) Date of Patent: Jul. 12, 2005

(54) CONTROL APPARATUS FOR MASTER/SLAVE OUTLETS

(76) Inventor: Jonie Chou, 9F-4, No. 232, Chung Ho Road, Chung Ho City, Taipei Hsien (TW)

(*) Notice: Subject to any disclaimer, the term of this patent is extended or adjusted under 35 U.S.C. 154(b) by 20 days.

(21) Appl. No.: 10/133,354

(22) Filed: Apr. 29, 2002

(65) Prior Publication Data

US 2003/0179524 A1 Sep. 25, 2003

(30) Foreign Application Priority Data

Mar. 21, 2002 (CN) .................................... 02204161 U

(51) Int. Cl.⁷ .............................................. H01H 47/00
(52) U.S. Cl. ...................... 361/191; 361/151; 361/155; 361/166; 361/187; 307/131; 307/31; 307/10.1; 307/41; 307/38
(58) Field of Search ................................. 361/191, 151, 361/155, 166, 187; 307/131, 31, 10.1, 41, 38

(56) References Cited

U.S. PATENT DOCUMENTS

| | | | | | |
|---|---|---|---|---|---|
| 4,687,948 | A | * | 8/1987 | Helt | 307/38 |
| 5,099,157 | A | * | 3/1992 | Meyer | 327/456 |
| 5,317,475 | A | * | 5/1994 | Siepmann | 361/154 |
| 5,563,455 | A | * | 10/1996 | Cheng | 307/41 |
| 5,699,051 | A | * | 12/1997 | Billig et al. | 340/657 |

* cited by examiner

*Primary Examiner*—Dean A. Reichard
*Assistant Examiner*—Anton Harris
(74) *Attorney, Agent, or Firm*—Troxell Law Office, PLLC

(57) ABSTRACT

A control apparatus for master/slave outlets having a current sensor, a driver, a large current switch component and a direct-bucking type power supply such that the working power source required by the master/slave equipment can be supplied stably. Further, the control apparatus for master/slave outlets provides a most simplified circuit to perform a function that the slave outlet supplies a power at the time the master outlet is supplied the power.

3 Claims, 2 Drawing Sheets

CONTROL APPARATUS FOR MASTER/SLAVE OUTLETS

BACKGROUND OF THE INVENTION

1. Field of the Invention

The present invention relates to a control device for a type of receptacle, and particularly to a control apparatus for master/slave outlets, with which a most simplified circuit can perform a function that the slave outlet only supplies the power at the time of the master outlet having supplied the power thereof under a condition of fulfilling safety codes regulated by all countries in the world.

2. Description of Related Art

A common power strip usually applies a switch to control if each of the outlets offers the power. However, due to the computer getting popular with versatile developments, a new style of the power strip in the market has been designed in this way that one of the outlets thereof is designated as a master outlet and the rest are designated as slave outlets. Wherein, the master outlet is powered on for supplying the current to the computer first and slave outlets (usually are connected to the periphery) then can be powered on afterward so that the periphery connected to the slave outlets can be powered off as soon as the computer is turned off or in a state of sleep mode.

Referring to FIG. 1, a block diagram of a conventional control apparatus for a power strip is illustrated. It can be seen in FIG. 1 that the control apparatus comprises an outlet control device 1, a plug 2, a master outlet 3 and at least a slave outlet 4. The outlet control device 1 further comprises an isolated current sensor 11, an amplifying and comparing circuit 12, a driver 13, a relay 14 and an isolated power supply 15.

Wherein, the isolated current sensor 11 is isolated from the alternate current of the master outlet and can be induced with a current signal. The amplifying and comparing circuit 12 is used for amplifying the induced current generated by the insulated current sensor 111 and sending the amplified induced current to a comparator 121 for comparing with a required reference voltage. If the voltage of the amplified current is greater than the reference voltage, a start signal is sent to the driver 13 to actuate the relay 14. The isolated power supply 15 is used for supplying the direct power source needed by the amplifying and comparing circuit 12, and by relay 14.

However, it is required for the conventional power strip during being designed to meet the safety regulations of all countries so that required safety spaces of the master outlet 3 and the slave outlet 4 have to be considered in the electronic circuit. Hence, the insulation parts, such as the isolated current sensor 11 and the isolated power supply 15, have to be installed and in this way, it results in an increased cost of the circuits.

SUMMARY OF THE INVENTION

The crux of present invention is to provide a control apparatus for master/slave outlets, which comprises current sensor, a driver, a large current switch component and a direct-bucking type power supply such that the working power source required by the master/slave equipment can be supplied stably. Further, the control apparatus for master/slave outlets provides a most simplified circuit to perform a function that the slave outlet only supplies the power at the time of the master outlet having been supplied the power thereof under a condition of meeting safety codes regulated by all countries in the world.

BRIEF DESCRIPTION OF THE DRAWINGS

The present invention can be more fully understood by reference to the following detailed description and accompanying drawings, in which.

DETAILED DESCRIPTION OF THE PREFERRED EMBODIMENTS

Figure 2:
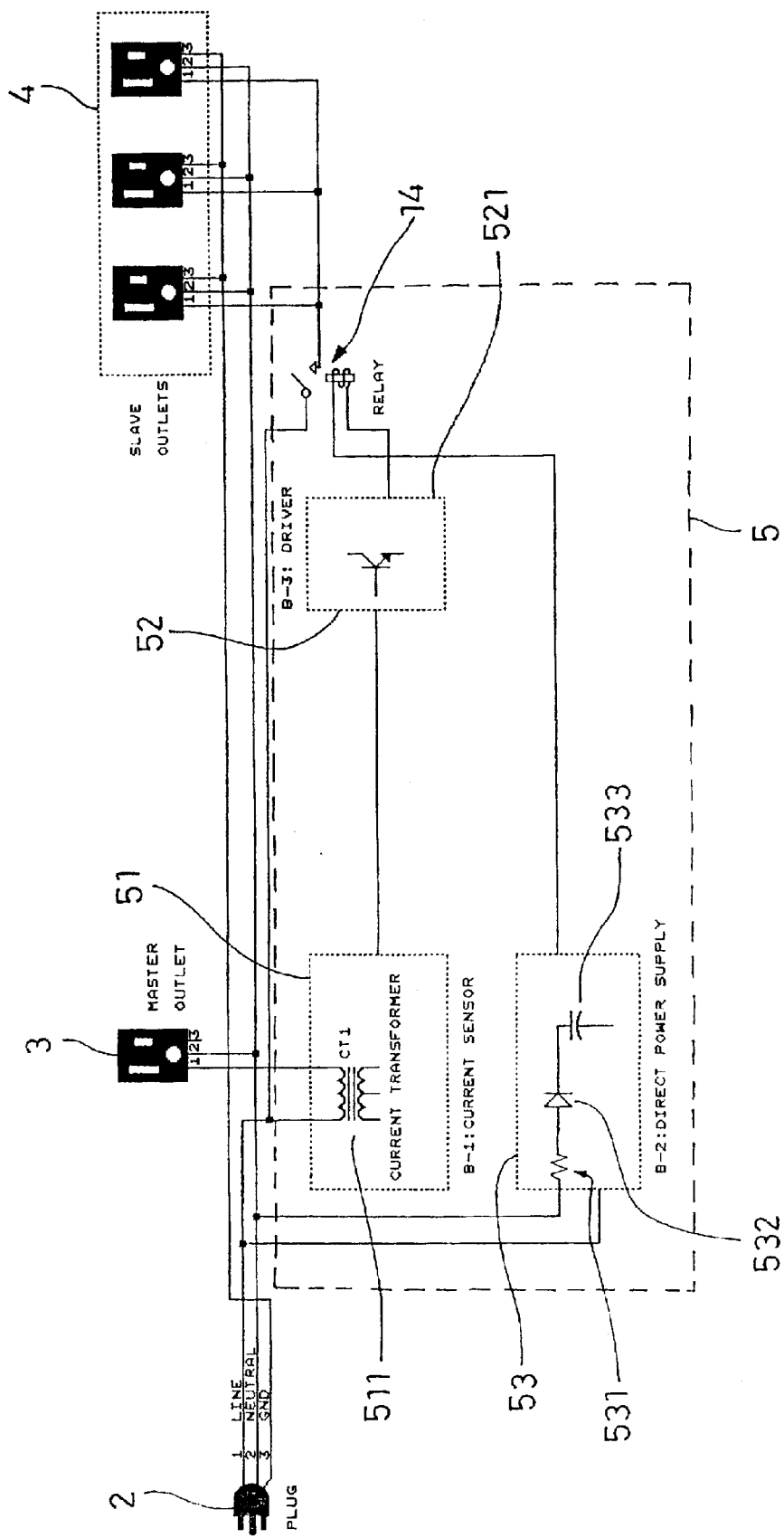
FIG. 2 is a plan view illustrating a control apparatus for master/slave outlets according to the present invention.

Referring to FIG. 2, a block diagram of a control apparatus for master/slave outlets of the present invention is illustrated. The control apparatus 5 comprises a current sensor 51, a driver 52, a large current switch component 14 and a direct-bucking type power supply 53.

Figure 1:
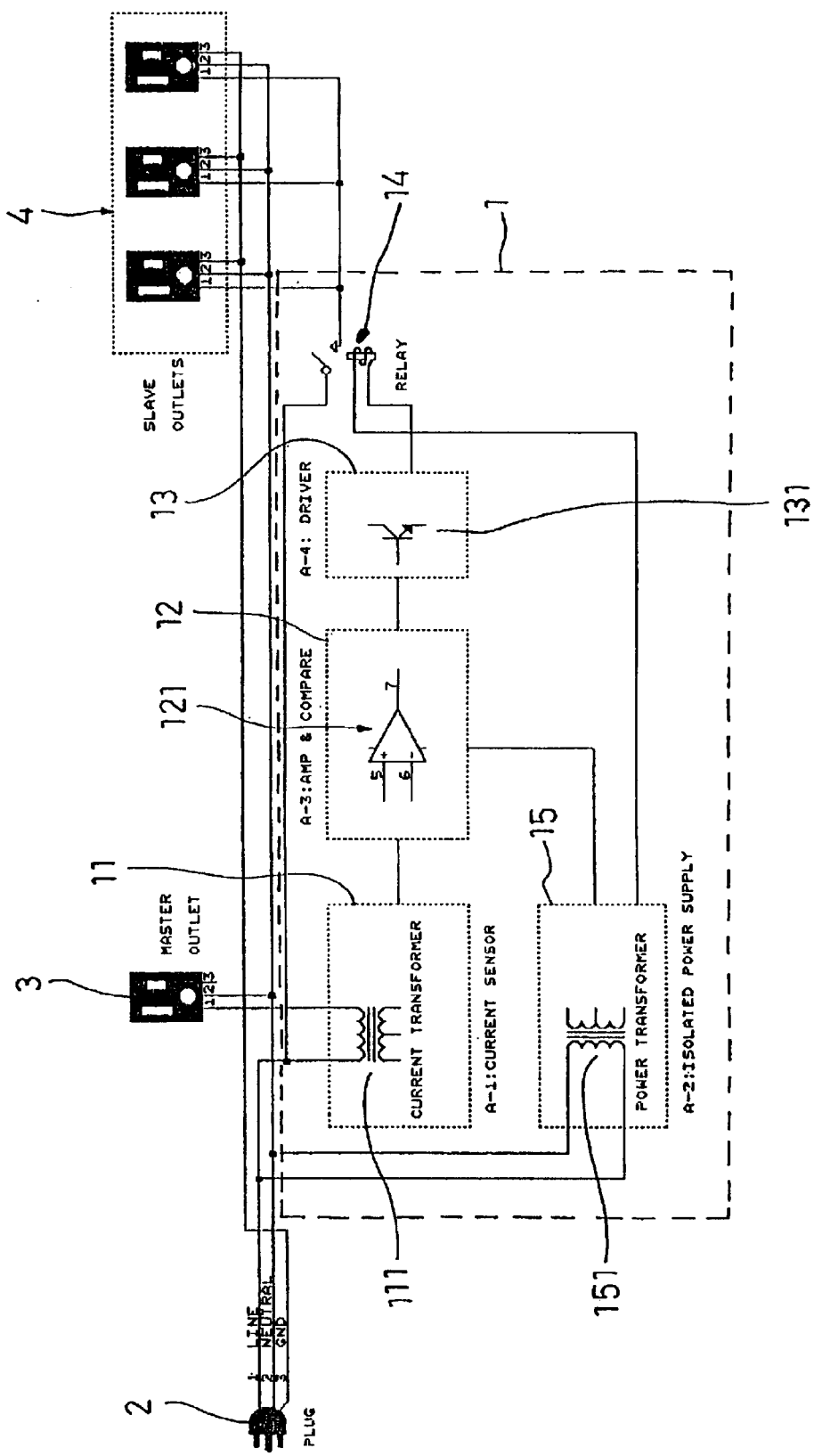
FIG. 1 is a block diagram of a conventional control apparatus for master/slave outlets.

Wherein, parts identical with those shown in FIG. 1 are assigned the same reference numbers to indicate the identical parts are conventional so that no detail will be described further. The current sensor 51 is coupled to an alternate power source so as to generate an induced power source signal. The current sensor 51 can be a resistance-current transformer or a Hall inductor 511 for inducing current. The driver 52 is coupled to the current sensor 51 for amplifying the induced power signal so that the driver 52 is a transistor 521 or a field effect transistor (MOSFET), which can simplify the current. The large current switch component 14, which preferably is a relay, is coupled to the alternate current power and the driver 52 so as to control "ON" or "OFF" of the alternate current power on a slave outlet 4. Further, the direct-bucking type power supply 53 is coupled to the alternate power supply for taking the direct voltage with the amplified induced power signal after being current limited and voltage bucked so that the large current switch component 14 can be controlled in a state of "ON" or "OFF".

Besides, the direct-bucking type power supply 53 further comprises a resistor 531, a diode 532 and a capacitor 533. The resistor 531 is used for limiting the current; the diode 532 is coupled to the resistor 531 for reducing the voltage and amplifying the current; and the capacitor 533 is coupled to the diode 532 so that the direct voltage can be taken out for being used in the large current switch component 14.

The present invention is different from the conventional one in that an amplifying and comparing circuit 12 and the isolated parts are omitted in the present invention. As soon as the electronic equipment (not shown) on the master outlet 3 is in a state of "IN" and the voltage induced by the current sensor 51 is sufficient to energize the transistor 521, the current amplified by the transistor 521 is capable of pulling down the coil in the large current switch component 14 such that the large current switch component 14 is conducted and the alternate current is sent to the slave outlet 4 for the electronic equipment (not shown). Furthermore, the direct-bucking type power supply 53 with an electronic circuit composed of the resistor 531, the diode 532 and the capacitor 533 replaces the conventional power transformer 151 to save the space thereof and lower the cost.

It is appreciated that the present invention provides a most simplified circuit to perform a function that the slave outlet only supplies the power at the time of the master outlet having supplied the power thereof under a condition of meeting safety codes regulated by all countries in the world.

While the invention has been described with reference to a preferred embodiment thereof, it is to be understood that modifications or variations may be easily made without departing from the spirit of this invention, which is defined by the appended claims.

What is claimed is:

1. A control apparatus for a master outlet and at least one slave outlet being used in a power strip comprising:
   a) a current sensor electrically connected to an alternate power supply and the master outlet, and generating an induced power signal from the alternate power supply;
   b) a driver electrically connected to the current sensor and amplifying the induced power signal;
   c) a large current switch component electrically connected to the alternate power supply, the driver, and the at least one slave outlet, the large current switch component being movable between on and off positions to control power to the at least one slave outlet; and
   d) a direct-bucking power supply electrically connected between the alternate power supply and the large current switch component, and generating a direct voltage, wherein the direct voltage and the induced power signal control the large current switch component after being current limited and voltage reduced wherein the direct-bucking power supply includes:
   i) a current limiting resistor;
   ii) a voltage reducing and current amplifying diode electrically connected to the current limiting resistor; and
   iii) a capacitor electrically connected to the diode and the large current switch component to control the large current switch component.

2. The control apparatus according to claim 1, wherein the driver is selected from the group consisting of a transistor and a field effect transistor.

3. The control apparatus according to claim 1, wherein the large current switch component is a relay.

* * * * *